(12) United States Patent
Klupar et al.

(10) Patent No.: US 7,407,137 B2
(45) Date of Patent: Aug. 5, 2008

(54) DUAL VOLTAGE INTEGRATED POWER AND ATTITUDE CONTROL SYSTEM AND METHOD

(75) Inventors: George J. Klupar, Phoenix, AZ (US); Calvin C. Potter, Mesa, AZ (US); Sharon K. Brault, Chandler, AZ (US); Robert J. Pinkerton, Chandler, AZ (US); Norman Stanley Kolecki, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 36 days.

(21) Appl. No.: 11/418,798

(22) Filed: May 5, 2006

(65) Prior Publication Data

US 2006/0284020 A1 Dec. 21, 2006

Related U.S. Application Data

(60) Provisional application No. 60/678,837, filed on May 6, 2005.

(51) Int. Cl.
*B64G 1/28* (2006.01)
(52) U.S. Cl. ............... 244/165; 244/164; 244/172.6; 244/172.7; 244/172.8; 244/172.9; 322/80; 318/727
(58) Field of Classification Search ............. 244/164, 244/165, 172.6–172.9
See application file for complete search history.

(56) References Cited

U.S. PATENT DOCUMENTS 3,620,846 A * 11/1971 Thomas ............... 136/245
3,813,067 A * 5/1974 Mork ................... 244/3.22
4,188,666 A * 2/1980 Legrand et al. .......... 701/13
4,649,287 A 3/1987 Nola
4,723,735 A * 2/1988 Eisenhaure et al. ...... 244/165
5,611,505 A 3/1997 Smay
5,681,193 A 10/1997 Pham et al.
5,874,786 A * 2/1999 McVey et al. ............ 307/18
5,984,236 A * 11/1999 Keitel et al. ............ 244/164
6,111,768 A 8/2000 Curtiss
6,113,033 A 9/2000 Parks et al.
6,234,427 B1 5/2001 Decker
6,384,559 B2 5/2002 Egami
6,454,218 B1 9/2002 Jacobson (Continued)

OTHER PUBLICATIONS

U.S. Appl. No. 10/641,509, filed Aug. 15, 2003, Potter et al.

*Primary Examiner*—Michael R. Mansen
*Assistant Examiner*—Valentina Xavier
(74) *Attorney, Agent, or Firm*—Ingrassia, Fisher & Lorenz, P.C.

(57) ABSTRACT

An integrated power and attitude control system and method for a vehicle efficiently supplies electrical power to both low voltage and high voltage loads, and does not rely on relatively heavy batteries to supply power during the vehicle initialization process. The system includes an energy storage flywheel, and a solar array that is movable between a stowed position and a deployed position. The energy storage flywheel is spun up, using electrical power supplied from a low voltage power source, to a rotational speed sufficient to provide attitude control. Then, after the solar array is moved to its deployed position, the energy storage flywheel is spun up, using electrical power supplied from a second power source, to a rotational speed sufficient to provide both attitude control and energy storage.

15 Claims, 4 Drawing Sheets

U.S. PATENT DOCUMENTS

| | | | |
|---|---|---|---|
| 6,609,037 B1 * | 8/2003 | Bless et al. ................... 700/45 |
| 6,614,132 B2 | 9/2003 | Hockney et al. |
| 6,637,702 B1 * | 10/2003 | McCandless ............. 244/172.6 |
| 6,779,759 B1 * | 8/2004 | Klupar et al. ............... 244/165 |
| 6,788,029 B1 | 9/2004 | Gabrys |
| 2003/0191576 A1 * | 10/2003 | Zarei ......................... 701/105 |
| 2004/0135034 A1 * | 7/2004 | Abel et al. .................. 244/165 |
| 2005/0061920 A1 * | 3/2005 | Brault et al. ................ 244/165 |
| 2007/0023580 A1 * | 2/2007 | Hart et al. ................... 244/165 |

\* cited by examiner

DUAL VOLTAGE INTEGRATED POWER AND ATTITUDE CONTROL SYSTEM AND METHOD

CROSS-REFERENCE TO RELATED APPLICATION

This application claims the benefit of U.S. Provisional Application No. 60/678,837, filed May 6, 2005.

This invention was made with Government support under Agreement No. F29601-01-2-0046 awarded by the U.S. Air Force, Air Force Research Laboratory. The government has certain rights in this invention.

TECHNICAL FIELD

The present invention relates to energy storage flywheel systems and, more particularly, to an integrated power and attitude control system and method that includes one or more energy storage flywheels that draw electrical power from, supply electrical power to, and/or regulate electrical power on two separate power buses of two different voltage magnitudes.

BACKGROUND

Many satellites and other spacecraft are powered from one or more solar arrays. The solar arrays are typically held in a retracted position during launch, and are then moved to a deployed position following, or during portions of, the spacecraft orbit initialization. In addition to the solar arrays, many spacecraft include one or more energy storage flywheels to provide both a backup power source and to provide attitude control for the vehicle. In such systems, each flywheel is controlled and regulated to balance the electrical demand in the vehicle electrical distribution system, and is also controlled in response to programmed or remote attitude (or torque) commands received by the vehicle main controller.

Some satellites and other spacecraft may additionally be implemented with one or more relatively high power loads. Such spacecraft, which are generally referred to herein as high power spacecraft, are generally safe and reliable. However, high power spacecraft can present challenging issues with respect to electrical power distribution bus voltage and orbit initialization. Each of these issues will be briefly discussed, beginning with the issue associated with electrical power distribution bus voltage.

Standard spacecraft components are typically designed to operate at a relatively low voltage, and are thus supplied with electrical power from a relatively low voltage power distribution bus. For example, many standard spacecraft are implemented with a 28 VDC power distribution bus. However, it is relatively inefficient to use a relatively low voltage power distribution bus to supply high power loads, due to the large associated current. One proposed solution to this drawback is to increase the voltage of the power distribution bus. The increased voltage allows smaller currents to provide the same amount of power to the high power loads. The smaller currents in turn result in lower line losses, and increased power distribution system efficiency. However, this solution presents its own drawback, in that most of the components on a spacecraft are typically low voltage loads (e.g., 28 VDC), and will thus need a voltage regulator, or other similar device. As is generally known, such devices also exhibit characteristic inefficiencies, which can eliminate any advantage that high voltage power distribution provides.

As regards orbit initialization, spacecraft have historically included onboard chemical batteries, which are fully charged when the spacecraft and its associated launch vehicle are launched. Typically, a spacecraft is launched in a "turned-off" state, and is then switched to a "turned-on" state when it is ejected from its associated launch vehicle. The batteries are sized to provide sufficient power to conduct the spacecraft orbit initialization process, prior to the spacecraft's solar arrays being deployed to collect energy from the sun. However, the amount of power needed to implement orbit initialization can result in an undesirably large battery size, which can increase overall spacecraft weight and cost.

Hence, there is a need for a system and method of providing power generation and attitude control for a high power spacecraft that addresses one or more of the above-noted drawbacks. Namely, a system and method that can efficiently supply electrical power to both low voltage and high voltage loads and/or a system and method that does not rely on relatively heavy batteries to supply power during spacecraft orbit initialization. The present invention addresses at least these needs.

BRIEF SUMMARY

The present invention provides a system and method that efficiently supplies electrical power to both low voltage and high voltage loads and that does not rely on relatively heavy batteries to supply power during spacecraft orbit initialization.

In one embodiment, and by way of example only, a satellite power generation and control system includes an energy storage flywheel, a motor/generator, and a motor/generator controller. The motor/generator is coupled to the energy storage flywheel, and includes at least first stator windings and second stator windings that are adapted to couple to a first power bus and a second power bus, respectively. The motor/generator is configured to operate in either a motor mode or a generate mode. In the motor mode electrical energy from the first power bus, the second power bus, or both power buses is converted to rotational kinetic energy and is supplied to the energy storage flywheel. In the generate mode, rotational kinetic energy from the energy storage flywheel is converted to electrical energy and is supplied to the first power bus, the second power bus, or both power buses. The motor/generator controller is adapted to receive one or more command signals and is operable, in response thereto, to control the operation of the motor/generator in either the motor mode or the generate mode, to thereby selectively supply electrical power to, or draw electrical power from, the first power bus, the second power bus, or both power buses.

In another exemplary embodiment, an integrated power and attitude control system includes a gimbal frame, an energy storage flywheel, a main controller, one or more actuators, a motor/generator, and a motor/generator controller. The energy storage flywheel is rotationally mounted in the gimbal frame. The main controller is coupled to receive at least a torque command signal and a power command signal and is operable, in response thereto, to supply a gimbal angular velocity command based at least in part on the torque command signal, and a flywheel acceleration command based at least in part on the torque command signal and the power command signal. The one or more actuators are coupled to receive the gimbal angular velocity command from the controller and are operable, in response thereto, to move the gimbal frame at the commanded angular velocity. The motor/generator is coupled to the energy storage flywheel, and includes at least first stator windings and second stator windings. The first and second stator windings are adapted to couple to a first power bus and a second power bus, respectively. The motor/generator is configured to operate in either a motor mode, whereby electrical energy from the first power bus, the second power bus, or both power buses, is converted to rotational kinetic energy and supplied to the energy storage flywheel, or a generate mode, whereby rotational kinetic energy from the energy storage flywheel is converted to electrical energy and supplied to the first power bus, the second power bus, or both power buses. The motor/generator controller is coupled to receive the flywheel acceleration command and is operable, in response thereto, to control operation of the motor/generator in either the motor mode or the generate mode, to thereby selectively supply electrical power to, or draw electrical power from, the first power bus, the second power bus, or both power buses, to thereby accelerate the energy storage flywheel at the commanded flywheel acceleration.

In yet another exemplary embodiment, a method of initializing a satellite having an energy storage flywheel rotationally mounted therein, and at least a solar array that is movable between a stowed position and a deployed position, includes spinning up the energy storage flywheel to at least a first predetermined rotational speed using electrical power supplied from at least a first power source. The solar array is moved from the retracted position to the deployed position and, after the solar array is in deployed position, the energy storage flywheel is spun up to at least a second predetermined rotational speed using electrical power supplied from at least a second power source. The first predetermined rotational speed is less than the second predetermined rotational speed, and the first power source has a voltage magnitude that is less a voltage magnitude of the second power source.

Other independent features and advantages of the preferred dual voltage power and attitude control system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a spacecraft. Thus, although the present embodiment is, for convenience of explanation, depicted and described as being implemented in a satellite, it will be appreciated that it can be implemented in other systems and environments, both terrestrial and extraterrestrial.

Figure 1:
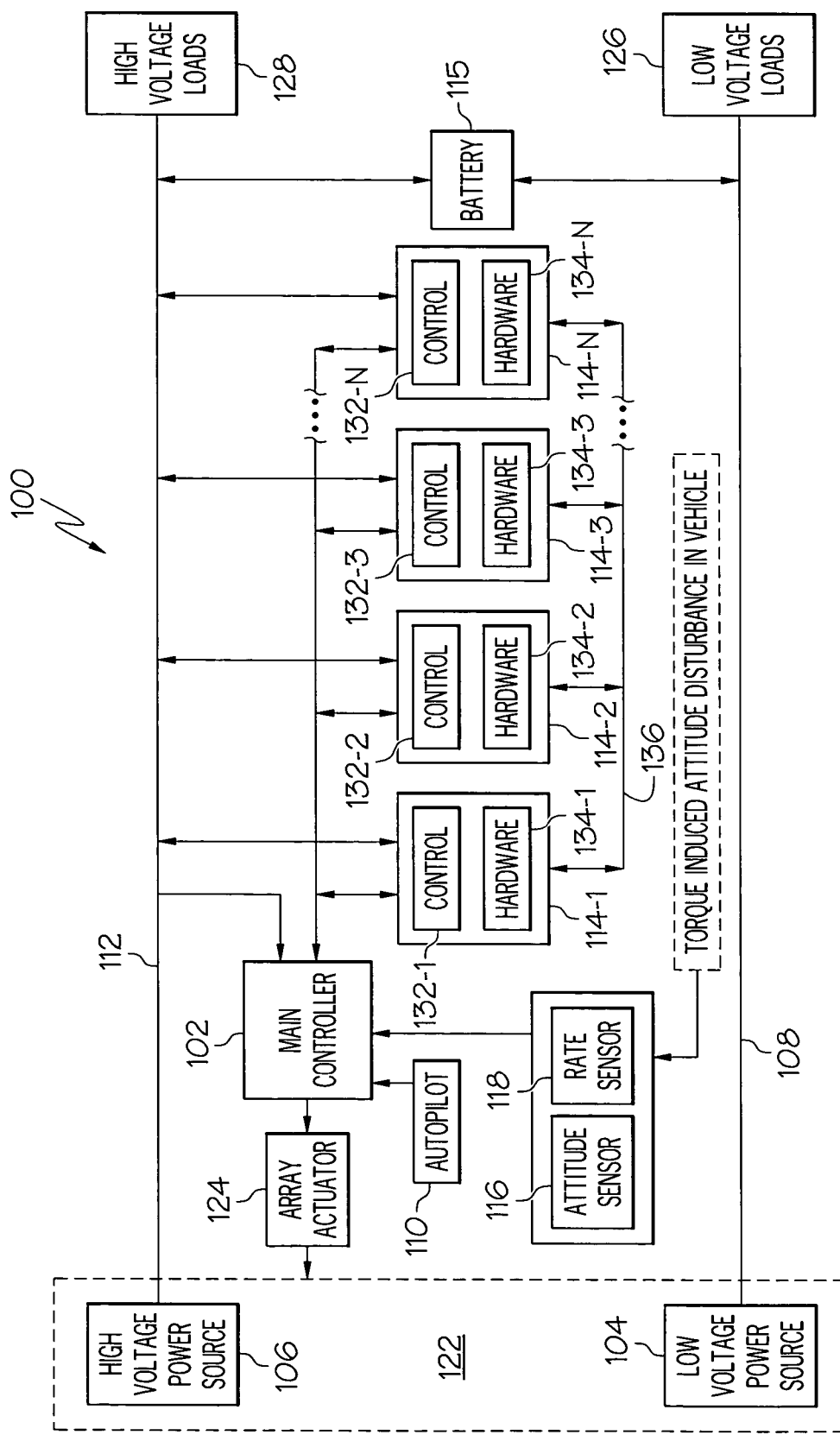
FIG. 1 is a functional block diagram of an exemplary embodiment of a dual voltage power and attitude control system for a spacecraft.

Turning now to the description and with reference first to FIG. 1, a functional block diagram of an exemplary integrated power and attitude control system 100 for a spacecraft, such as a satellite, is shown. The system 100 includes a main controller 102, a low voltage power source 104, a high voltage power source 106, a low voltage power distribution bus 108, a high voltage power distribution bus 112, and a plurality of energy storage flywheel systems 114 (114-1, 114-2, 114-3, . . .114-N). The main controller 102 receives attitude commands (or torque commands) from, for example, an earthbound station or an onboard autopilot 110, and monitors the low voltage and high voltage power distribution buses 108, 112, and appropriately controls the operation of the energy storage flywheel systems 114. In response to the torque commands, the energy storage flywheel systems 114 are controlled to induce appropriate attitude disturbances in the spacecraft, and thereby control spacecraft attitude. In addition, depending upon the state of the low voltage and high voltage power distribution buses 108, 112, the energy storage flywheels 114 are controlled to either supply electrical energy to, or draw electrical energy from, one or both of the power distribution buses 108, 112. One or more spacecraft dynamic sensors, such as one or more attitude sensors 116 and one or more rate sensors 118, sense spacecraft attitude and attitude rate-of-change, respectively, and supply feedback signals representative thereof to the main controller 102.

The low voltage and high voltage power sources 104, 106, as the respective names connote, supply relatively low voltage and relatively high voltage electrical power to the low voltage and high voltage power distribution buses 108, 110, respectively. In the depicted embodiment, in which the system 100 is implemented in a spacecraft, both the low voltage and high voltage power sources 104, 106 are implemented using one or more solar panels, each of which includes an array of solar cells to convert light energy into electrical energy. Although the low voltage and high voltage power sources 104, 106 could be implemented using separate solar panels or separate sets of solar panels, in the depicted embodiment, the low voltage and high voltage power sources 104, 106 are implemented as part of the same solar array 122, or sets of solar arrays 122.

Figure 2:
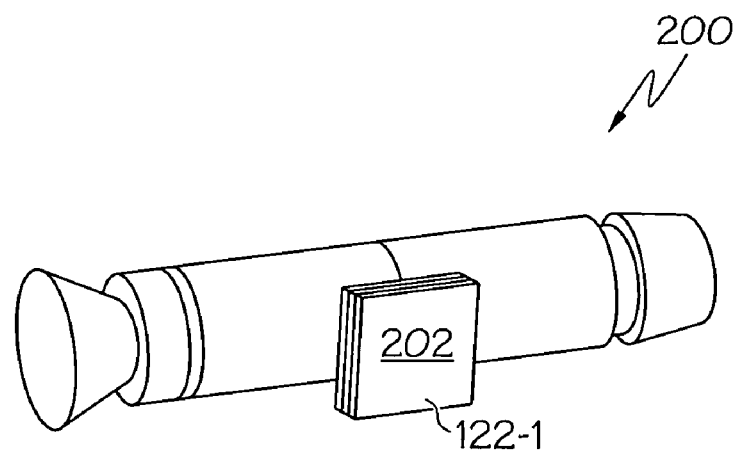
FIGS. 2 and 3 are a perspective views of a physical embodiment of a spacecraft that may incorporate the system of FIG. 1, showing its solar arrays in a stowed and a deployed position, respectively.
Figure 3:
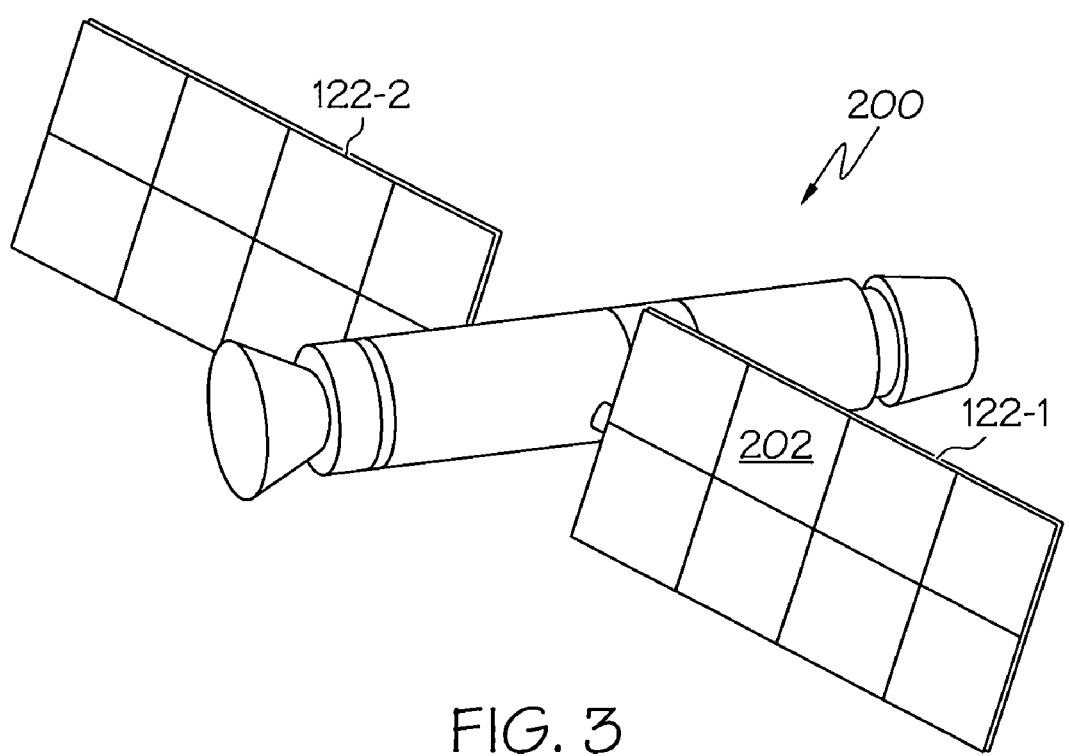

With reference now to FIGS. 2 and 3, in a particular embodiment of the spacecraft 200, the system 100 is implemented using a set of solar arrays 122-1, 122-2. As depicted therein, the solar arrays 122 each include a plurality of solar panels 202, with each panel 202 having the above-mentioned array of solar cells. The solar arrays 122 may be attached to the spacecraft 200 itself, or to fixed or moveable structures that extend from the spacecraft 200. No matter how the solar arrays 122 are specifically coupled to the spacecraft 200, each is preferably movable between a stowed position and a deployed position. Thus, and with quick reference back to FIG. 1, the system additionally includes one or more array actuators 124 that are coupled to the solar arrays 122 and, in response to commands received from the main controller 102, supply a drive force to the solar arrays 122 to thereby move the solar arrays 122 between the stowed and deployed positions. In the stowed position, which is the position shown in FIG. 2, it is seen that less than all of the solar panels 202 are exposed. Conversely, in the deployed position, which is the position shown in FIG. 3, it is seen that all of the solar panels 202 are exposed. Hence, when the solar arrays 122 are in the stowed position, each is capable of supplying only a fraction of the electrical power that it is capable of supplying when it is in the deployed position.

Returning once again to FIG. 1, the low voltage and high voltage power distribution buses 108, 112, as these names similarly connote, distribute relatively low voltage and relatively high voltage electrical power, respectively. Various low voltage loads 126 are coupled to, and receive electrical power from, the low voltage power distribution bus 108. Similarly, various high voltage loads 128 are coupled to, and receive electrical power from, the high voltage power distribution bus 112. It will be appreciated that the specific voltage magnitudes at which the low voltage and high voltage power sources 104, 106 and the low voltage and high voltage power distribution buses 108, 112 supply and distribute electrical power may vary depending, for example, on the particular electrical loads being served. In the depicted embodiment, however, in which the system is implemented in a spacecraft 200, the low voltage power source 104 and low voltage power distribution bus 108 supply and distribute electrical power at about 28 VDC, and the high voltage power source 106 and high voltage power distribution bus 112 supply and distribute electrical power at about 120 VDC.

In addition to the low voltage and high voltage power sources 104, 106, the system 100 also includes a battery 115. The battery 115, at least in the depicted embodiment, is coupled to both the low voltage and high voltage power distribution buses 108, 112, and selectively supplies electrical power to, and draws electrical power from, these buses 108, 112. It will be appreciated, however, that the battery 115 could instead be coupled to only one of the power distribution buses 108, 112. The battery 115 is preferably fully charged when the spacecraft is launched and, as will be described in more detail further below, supplies electrical power to at least the low voltage power bus 108 during the spacecraft orbit initialization process. The battery 115 also acts as an additional source of backup electrical power following initialization, in the unlikely event that one or more of the energy storage flywheel systems 114 become inoperable. As will also be described further below, because the battery 115 is not the sole electrical power source during orbit initialization nor the sole backup power source thereafter, its size can be minimized to meet these functions. As a result, the battery 115 preferably is relatively small.

The system 100 may include a single energy storage flywheel system 114, or a plurality of energy storage flywheel systems 114. In a particular preferred embodiment, the system includes a plurality (e.g., N-number) of energy storage flywheel systems 114 (114-1, 114-2, 114-3, . . . 114-N). In addition, the system 100 is preferably configured so that some of the energy storage flywheel systems 114 are active, while one or more of the remaining energy storage flywheel systems 114 are in a standby, inactivated state. Thus, the system 100 is at least single fault tolerant. The number of energy storage flywheel systems 114 that are active may vary, depending on system requirements. In a particular preferred embodiment, four energy storage flywheel systems 114 are active and the remaining are inactive.

Figure 4:
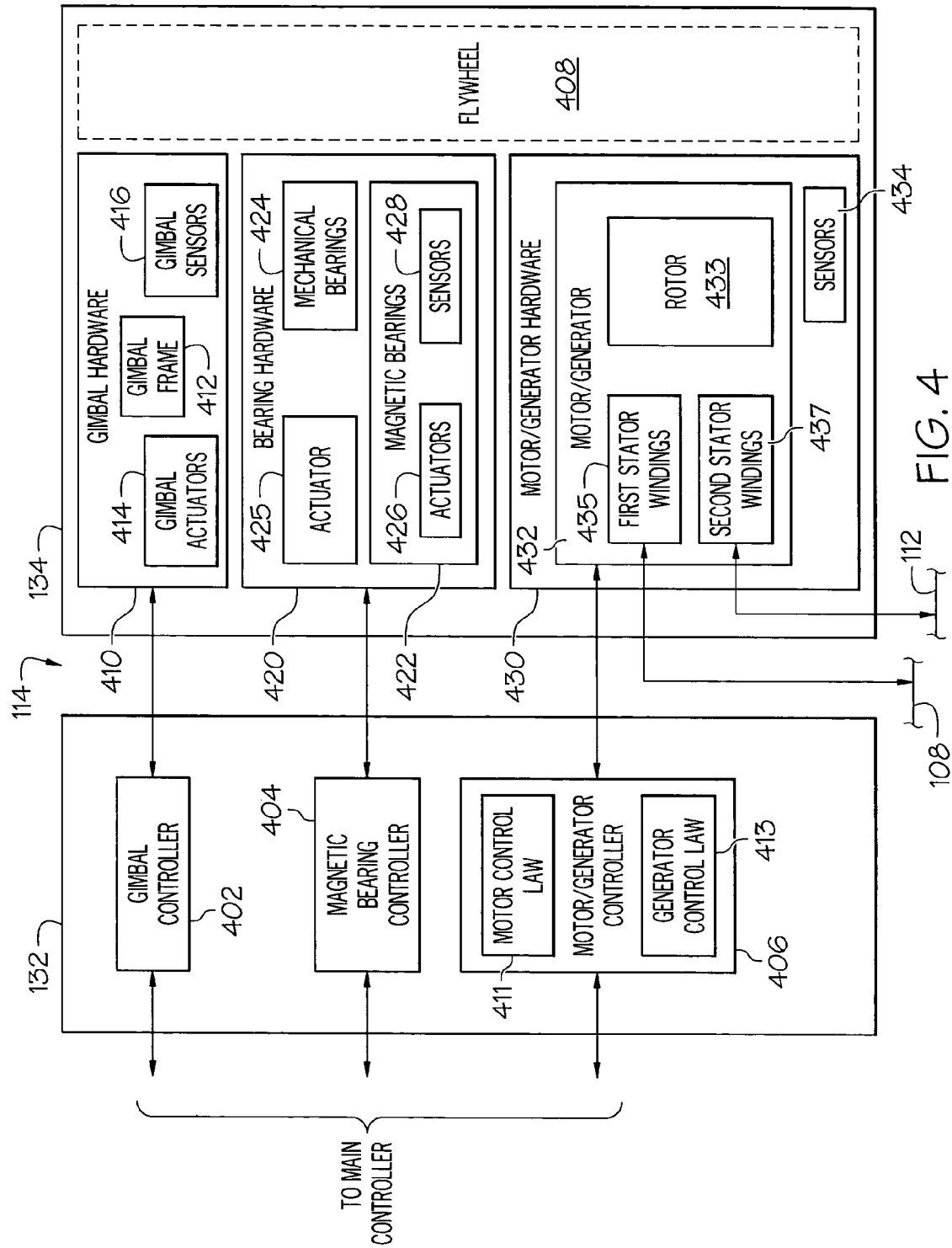
FIG. 4 is a functional block diagram of an exemplary embodiment of one energy storage flywheel system that may be used in the system of FIG. 1.

The energy storage flywheel systems 114 each include a flywheel control module 132 (132-1, 132-2, 132-3, . . . 132-N) and flywheel hardware 134 (134-1, 134-2, 134-3, . . . 134-N). The flywheel control modules 132 are each in operable communication with the main controller 102 and, in the depicted embodiment, are in communication with one another via a data bus 136. The main controller 102, as was noted above, supplies attitude control commands to the each of the flywheel control modules 132. In turn, the flywheel control modules 132 control the relative attitudes and angular velocities of the associated flywheel hardware 134 to effect attitude control of the spacecraft 200. The flywheel control modules 132 also respond to commands from the main controller 102 to control the operation of the associated flywheel hardware 134 in either a motor mode or a generator mode, and the rotational acceleration of the associated flywheel hardware 134 in each mode. The flywheel control modules 132 also monitor various parameters of the associated flywheel hardware 134, and supply representative signals to the main controller 102. A block diagram of an exemplary embodiment one energy storage flywheel system 114 is illustrated in FIG. 4 and, for completeness, will now be described.

The flywheel control modules 132 each include three separate controllers—a gimbal controller 402, a magnetic bearing controller 404, and a motor/generator controller 406. The flywheel hardware 134 includes an energy storage flywheel 408, gimbal hardware 410, bearing hardware 420 (which includes both magnetic bearings 422 and mechanical bearings 424), and motor/generator hardware 430. The gimbal controller 402 receives gimbal angle velocity commands from the main controller 102, and supplies appropriate control signals to, and receives various feedback signals from, the gimbal hardware 410, to effect attitude control. At least some of the feedback signals the gimbal controller 410 receives are representative of the gimbal hardware 410 response to the supplied control signals. The gimbal controller 402 also supplies these feedback signals to the main controller 102.

In the depicted embodiment, the gimbal hardware 410 includes a gimbal frame 412, one or more gimbal actuators 414, and one or more gimbal sensors 416. The energy storage flywheel 408 is mounted in the gimbal frame 412. The gimbal frame 412 is rotationally mounted about one gimbal axis, which is perpendicular to the spin axis of the energy storage flywheel 408. The gimbal actuators 414 are coupled to the gimbal frame 412, and are also coupled to receive the control signals from the gimbal controller 402. As is generally known, attitude control in the spacecraft 200 may be implemented by changing the gimbal angles at certain rates (e.g., angular velocities). Thus, in response to the commands received from the main controller 102, the gimbal controller 402 supplies appropriate control signals to the gimbal actuators 414. In response to these control signals, the gimbal actuators 414 appropriately position the gimbal frame 412 at the appropriate angular velocities. The gimbal sensors 416 include sensors that can sense at least the position and rate of the gimbal frame 412, and supply position and rate feedback signals to the gimbal controller 402 and to the main controller 102.

The magnetic bearing controller 404 may also receive one or more signals from the main controller 102. The magnetic bearing controller 404, in accordance with an appropriate control law, supplies appropriate command signals to, and receives various feedback signals from, the magnetic bearings 422. At least some of the feedback signals received by the magnetic bearing controller 404 are representative of the magnetic bearing 422 response to the supplied control signals. Similar to the gimbal controller 402, the magnetic bearing controller 404 may supply one or more of the feedback signals it receives to the main controller 102.

The magnetic bearings 422 function to rotationally mount or levitate, in non-contact fashion, the energy storage flywheel 408. In the depicted embodiment, the magnetic bearings 422 are implemented as active magnetic bearings, and include electromagnetic actuators 426 and position sensors 428. The position sensors 428 sense the position of the flywheel rotor (not illustrated) and supply appropriate position signals to the magnetic bearing controller 404. The magnetic bearing controller 404, in accordance with the control law, supplies the appropriate current magnitude to the electromagnetic actuators 426, which in turn generate magnetic forces of the appropriate magnitude to appropriately position the flywheel rotor. Though not depicted in FIG. 4, the magnetic bearings 422 may include one or more temperature sensors. Although a full compliment of active magnetic bearings are shown in FIG. 4, it will be appreciated that the magnetic bearings 422 could be configured to implement some passive magnetic bearings.

The mechanical bearings 424, which may be implemented using any one of numerous types of rolling element bearings, rotationally mount the energy storage flywheel 408 whenever the magnetic bearings 422 are not being used. In particular, and as will be described in more detail further below, the mechanical bearings 424 rotationally mount the energy storage flywheel during spacecraft 200 launch, and during at least portions of the spacecraft orbit initialization. Thereafter, when the magnetic bearings 422 are energized and operating properly, the mechanical bearings 424 are retracted. In the depicted embodiment, an actuation device 425 that is responsive to commands from either the main controller 102 or the magnetic bearing controller 404 is provided to move the mechanical bearings 424 into and out of contact with the energy storage flywheel 408. It will additionally be appreciated that the mechanical bearings 424 may be automatically moved into engagement with the energy storage flywheel 408 if one or more of the magnetic bearings 422 is determined to be inoperable.

The motor/generator hardware 430 includes a motor/generator 432 and one or more sensors 434. The motor/generator 432 may be any one of numerous motor/generator sets known now, or in the future, including numerous types of AC and DC motor/generators. In a preferred embodiment, however, the motor/generator is a brushless DC motor/generator, and includes a main rotor 433, first stator windings 435, and second stator windings 437. The main rotor 433 is coupled to the rotor of the energy storage flywheel 408, the first stator windings 435 are coupled to the low voltage power distribution bus 108, and the second stator windings 437 are coupled to the high voltage power distribution bus 112. The sensors 434 include one or more temperature sensors, one or more commutation sensors, one or more rotational speed sensors, and one or more current sensors.

The motor/generator 432 may be configured to operate in either a motor mode or a generate mode. During operation in the motor mode, the motor/generator 432 converts electrical energy from the low voltage power distribution bus 108, the high voltage power distribution bus 112, or both, to rotational kinetic energy, to spin up the energy storage flywheel 408 and store rotational kinetic energy therein. During operation in the generate mode, the motor/generator 432 spins down the energy storage flywheel 408, converting the flywheel's stored rotational kinetic energy to electrical energy, which is supplied to the low voltage power distribution bus 108, the high voltage power distribution bus 112, or both.

The motor/generator controller 406 receives signals 438 representative of the bus voltages of both the low voltage and high voltage power distribution buses 108, 112. The motor/generator controller 402 also receives commands from the main controller 102 and, in response, controls the rotational acceleration of the motor/generator and thus the energy storage flywheel 408. To do so, the motor/generator controller 406 is configured to selectively implement either a motor control law 411 or a generator control law 413. The motor/generator controller 406 also receives various feedback signals from the motor/generator hardware 430. At least some of the feedback signals received by the motor/generator controller 406 are representative of the motor/generator hardware 430 response to the supplied control signals. The motor/generator controller 406 supplies one or more of the feedback signals it receives from the motor/generator hardware 430 to the main controller 102.

In addition to configuring the motor/generator 432 to operate in either the motor mode or the generate mode, the motor/generator controller 406 controls motor/generator operation so that the voltage of the low voltage power distribution bus 108, the high voltage power distribution bus 112, or both, is (or are) regulated. It will be appreciated that each motor/generator controller 406 may be variously configured to implement this functionality. In a particular preferred embodiment, however, each motor/generator controller 406 is similarly implemented as described in U.S. patent application Ser. No. 10/641,509, entitled, "ENERGY STORAGE FLYWHEEL VOLTAGE REGULATION AND LOAD SHARING SYSTEM AND METHOD," the entirety of which is incorporated herein by reference.

The main controller 102, as was generally described above, is preferably configured to control both the power and attitude of the spacecraft 200. It will be appreciated that the main controller 102 could be implemented according to any one of numerous configurations to implement this functionality. In a particular preferred embodiment, however, the main controller 102 is implemented as described in U.S. Pat. No. 6,779,759, entitled, "INTEGRATED POWER AND ATTITUDE CONTROL SYSTEM AND METHOD," the entirety of which is incorporated herein by reference.

Figure 5:
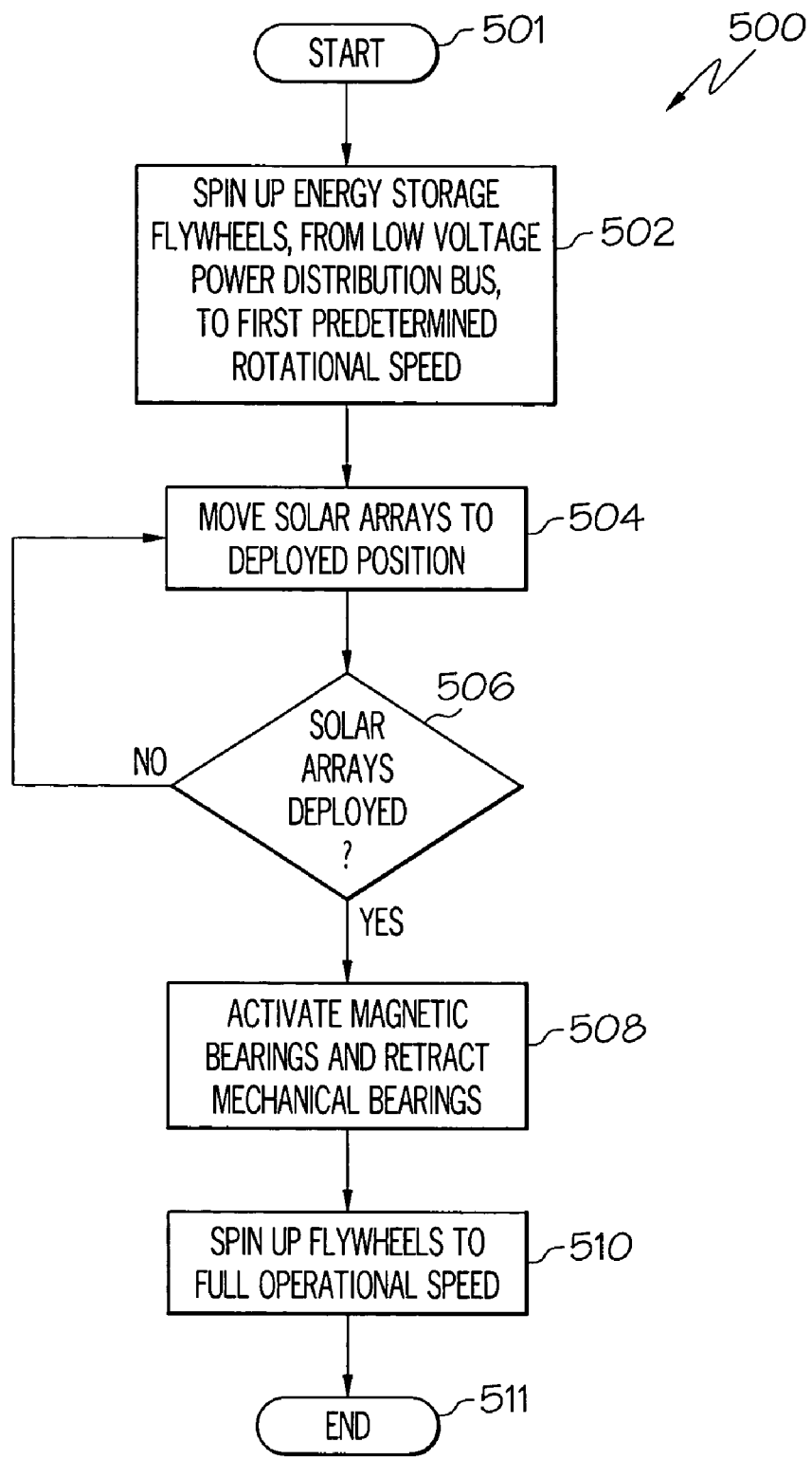
FIG. 5 is a flowchart of an exemplary orbit initialization process that may be implemented by the system of FIG. 1 for the spacecraft of FIGS. 1 and 2.

As was previously stated, the spacecraft 200 is launched with the solar arrays 122 in the retracted position. In addition, the spacecraft 200 is launched with the battery 115 in a fully charged state, and the energy storage flywheels 408 in a fully-discharged (e.g., non-rotating) state. The spacecraft 200 remains in this configuration immediately subsequent to its separation from its associated launch vehicle (not illustrated). Therefore, the energy storage flywheels 408 are unable to supply power to the spacecraft 200 prior to deployment of the solar arrays 122. However, the relatively small battery 115, together with the power that the solar arrays 122 are capable of supplying in the retracted position, provides sufficient power to implement orbit initialization. In the depicted embodiment, the main controller 102 controls the orbit initialization process, though it could be controlled in more or more other or additional devices. In any case, an exemplary embodiment of the orbit initialization process that is implemented in the spacecraft 200 is depicted in flowchart form in FIG. 5, and with reference thereto will now be described. Before doing so, however, it will be appreciated that the process 500 depicted therein assumes the spacecraft 200 has separated from its launch vehicle and is ready to establish its orbit. It is additionally noted that the parenthetical references in the following description coincide with the like-numbered process blocks in the depicted flowchart.

As was previously noted, when the spacecraft 200 is launched and initially separated from its launch vehicle, the solar arrays 122 are in the retracted position, and thus only a portion of the panels 202 are exposed to sunlight. Nonetheless, the solar arrays 122 are configured such that, when they are in the stowed position, they can supply some electrical power to the low voltage power distribution bus 108. The power supplied from the stowed solar arrays 122, in combination with the electrical power supplied from the battery 115, provides sufficient power to initialize the spacecraft 200. More specifically, the amount of electrical power supplied from the stowed solar arrays 122 and the battery 115 is at least sufficient to spin the energy storage flywheels 408 up to a speed at which the flywheels 408 can provide attitude control torque, but not power storage (502). Preferably, the energy storage flywheels 114 are spun up on the mechanical bearings 424 to conserve energy and increase reliability.

While the energy storage flywheels 408 are being spun up to the speed sufficient to provide attitude control, or shortly before or shortly thereafter, the solar arrays 122 are commanded to the deployed position (504). When the solar arrays 122 reach the deployed position and begin supplying energy to the high voltage power distribution bus 112 (506), the magnetic bearings 422 are used to levitate the energy storage flywheels 408, and the mechanical bearings 424 are disengaged (508). The energy storage flywheels 408 are then spun up to the full operational speed (510), and are then used to provide power storage and regulation, in addition to attitude control.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A satellite power generation and control system, comprising:
    a first power bus configured to supply one or more loads rated to operate at a first voltage magnitude;
    a second power bus configured to supply one or more loads rated to operate at a second voltage magnitude that is greater than the first voltage magnitude;
    an energy storage flywheel;
    a motor/generator coupled to the energy storage flywheel and including at least first stator windings and second stator windings coupled to the first power bus and the second power bus, respectively, the motor/generator configured to operate in either (i) a motor mode, whereby electrical energy from the first power bus, the second power bus, or both power buses is converted to rotational kinetic energy and supplied to the energy storage flywheel or (ii) a generate mode, whereby rotational kinetic energy from the energy storage flywheel is converted to electrical energy and supplied to the first power bus, the second power bus, or both power buses; and
    a motor/generator controller adapted to receive one or more command signals and operable, in response thereto, to control operation of the motor/generator in either the motor mode or the generate mode, to thereby selectively supply electrical power to, or draw electrical power from, the first power bus, the second power bus, or both power buses.

2. The system of claim 1, further comprising:
    a solar array coupled to the first and second power buses and operable to convert light energy into electrical energy, the solar array movable between a stowed state, in which the solar array can supply the electrical energy at a first maximum voltage magnitude, and a deployed state, in which the solar array can supply the electrical energy at a second maximum voltage magnitude that is greater than the first maximum voltage magnitude.

3. The system of claim 1, further comprising:
    two or more additional energy storage flywheels;
    two or more additional motor/generators, each additional motor/generator coupled to, and associated with, one of the additional energy storage flywheels, each of the additional motor/generators including at least first stator windings and second stator windings adapted to couple to the first power bus and the second power bus, respectively, and configured to operate in either (i) a motor mode, whereby electrical energy from the first power bus, the second power bus, or both power buses is converted to rotational kinetic energy and supplied to its associated energy storage flywheel or (ii) a generate mode, whereby rotational kinetic energy from its associated energy storage flywheel is converted to electrical energy and supplied to the first power bus, the second power bus, or both power buses; and
    two or more additional motor/generator controllers, each additional motor/generator controller associated coupled to, and associated with, one of the additional motor/generators, each additional motor/generator controller adapted to receive the one or more command signals and operable, in response thereto, to control operation of its associated motor/generator in either the motor mode or the generate mode, to thereby selectively supply electrical power to, or draw electrical power from, the first power bus, the second power bus, or both power buses.

4. The system of claim 3, wherein:
    each motor/generator is further configured to supply a plurality of signals, each signal representative of a motor/generator operational parameter; and
    each motor/generator controller is coupled to receive a plurality of motor/generator operational parameter signals from each of the motor/generators and is operable, in response thereto, to control its associated motor/generators in either the motor mode or the generate mode, to thereby regulate first power bus voltage, second power bus voltage, or both power bus voltages, and substantially equally share electrical load between the motor/generators.

5. The system of claim 1, further comprising:
    a main controller operable to supply the command signals to the motor/generator controller.

6. The system of claim 1, further comprising:
    a battery coupled to at least one of the first power bus or the second power bus, to thereby selectively supply electrical power thereto, or draw electrical power therefrom.

7. The system of claim 1, further comprising:
    one or more magnetic bearings rotationally mounting the energy storage flywheel; and
    a magnetic bearing controller coupled to receive bearing command signals and operable, in response thereto, to supply position control signals to the magnetic bearings.

8. An integrated power and attitude control system, comprising:
    a gimbal frame;
    an energy storage flywheel rotationally mounted in the gimbal frame;
    a main controller coupled to receive at least a torque command signal and a power command signal and operable, in response thereto, to supply (i) a gimbal angular velocity command based at least in part on the torque command signal and (ii) a flywheel acceleration command based at least in part on the torque command signal and the power command signal;
    one or more actuators coupled to receive the gimbal angular velocity command from the controller and operable, in response thereto, to move the gimbal frame at the commanded angular velocity;

a first power bus configured to supply one or more loads rated to operate at a first voltage magnitude;

a second power bus configured to supply one or more loads rated to operate at a second voltage magnitude that is greater than the first voltage magnitude;

a motor/generator coupled to the energy storage flywheel and including at least first stator windings and second stator windings coupled to the first power bus and the second power bus, respectively, the motor/generator configured to operate in either (i) a motor mode, whereby electrical energy from the first power bus, the second power bus, or both power buses, is converted to rotational kinetic energy and supplied to the energy storage flywheel or (ii) a generate mode, whereby rotational kinetic energy from the energy storage flywheel is converted to electrical energy and supplied to the first power bus, the second power bus, or both power buses; and a motor/generator controller coupled to receive the flywheel acceleration command and operable, in response thereto, to control operation of the motor/generator in either the motor mode or the generate mode, to thereby selectively supply electrical power to, or draw electrical power from, the first power bus, the second power bus, or both power buses, to thereby accelerate the energy storage flywheel at the commanded flywheel acceleration.

9. The system of claim 8, wherein the controller comprises:

a gimbal control circuit coupled to receive the torque command signal and operable, in response thereto, to supply the gimbal angular velocity command.

10. The system of claim 8, further comprising:

a battery coupled to at least one of the first power bus or the second power bus, to thereby selectively supply electrical power thereto, or draw electrical power therefrom.

11. The system of claim 8, wherein the flywheel system further includes:

one or more magnetic bearings rotationally mounting the energy storage flywheel in the gimbal frame; and a magnetic bearing controller coupled to receive bearing command signals and operable, in response thereto, to supply position control signals to each of the magnetic bearings, wherein the main controller is further operable to selectively supply the bearing command signals to the magnetic bearing controller.

12. The system of claim 8, further comprising:

one or more solar arrays coupled to the first and second power buses and operable to convert light energy into electrical energy, the one or more solar arrays movable between a stowed position, in which the one or more solar arrays can supply the electrical energy at a first maximum voltage magnitude, and a deployed position, in which the one or more solar arrays can supply the electrical energy at a second maximum voltage magnitude that is greater than the first maximum voltage magnitude.

13. The system of claim 12, further comprising:

one or more array actuators coupled to the one or more solar arrays, the one or more array actuators coupled to receive actuation command signals and operable, upon receipt thereof, to supply a drive force that moves the one or more solar arrays between the stowed and deployed positions, wherein the main controller supplies the actuation commands to the one or more array actuators.

14. The system of claim 8, further comprising:

an attitude sensor adapted to mount on a vehicle and configured to sense vehicle attitude relative to a reference and supply a position feedback signal to the controller, wherein the controller is responsive to the position feedback signal to thereby adjust at least the gimbal angular velocity command signal to achieve the commanded torque.

15. The system of claim 14, wherein:

the vehicle has multiple degrees of freedom;

the controller is operable to supply independent gimbal angular velocity commands and independent flywheel acceleration commands for at least each of the vehicle degrees of freedom; and the system further comprises:

two or more additional gimbals, two or more additional energy storage flywheels, each additional energy storage flywheel rotationally mounted in one of the additional gimbals, two or more additional motor/generators, each additional motor/generator coupled to, and associated with, one of the additional energy storage flywheels, each of the additional motor/generators including at least first stator windings and second stator windings adapted to couple to the first power bus and the second power bus, respectively, and configured to operate in either (i) a motor mode, whereby electrical energy from the first power bus, the second power bus, or both power buses is converted to rotational kinetic energy and supplied to its associated energy storage flywheel or (ii) a generate mode, whereby rotational kinetic energy from its associated energy storage flywheel is converted to electrical energy and supplied to the first power bus, the second power bus, or both power buses; and two or more additional motor/generator controllers, each additional motor/generator controller associated coupled to, and associated with, one of the additional motor/generators, each additional motor/generator controller coupled to receive flywheel acceleration commands and operable, in response thereto, to control operation of its associated motor/generator in either the motor mode or the generate mode, to thereby selectively supply electrical power to, or draw electrical power from, the first power bus, the second power bus, or both power buses, to thereby accelerate the energy storage flywheel at the commanded flywheel acceleration.

* * * * *